(12) United States Patent
Breuer et al.

(10) Patent No.: US 7,155,666 B2
(45) Date of Patent: Dec. 26, 2006

(54) CREATING AND DISPLAYING DOCUMENT UNDO CONFIGURATION USING NESTED TEST MODES

(75) Inventors: Matthias Breuer, Seevetal (DE); Andre Kuemmel, Oldenburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 523 days.

(21) Appl. No.: 10/002,215

(22) Filed: Nov. 1, 2001

(65) Prior Publication Data
US 2002/0055948 A1     May 9, 2002

(30) Foreign Application Priority Data
Nov. 3, 2000   (EP)   .................................. 00123924
Apr. 24, 2001  (EP)   .................................. 01109921

(51) Int. Cl.
G06F 7/00     (2006.01)
(52) U.S. Cl. ..................... 715/511; 715/500; 715/503
(58) Field of Classification Search ........ 715/503–504, 715/500, 511
See application file for complete search history.

(56) References Cited

U.S. PATENT DOCUMENTS

| | | | |
|---|---|---|---|
| 5,276,607 A | 1/1994 | Harris et al. ................. | 345/467 |
| 5,303,146 A | 4/1994 | Ammirato et al. ........... | 715/503 |
| 5,339,410 A | 8/1994 | Kanai .......................... | 707/100 |
| 5,371,657 A | 12/1994 | Wiscombe ................... | 362/103 |
| 5,499,180 A | 3/1996 | Ammirato et al. ........... | 715/511 |
| 5,644,736 A | 7/1997 | Healy et al. ................. | 345/784 |
| 5,727,161 A | 3/1998 | Purcell, Jr. ...................... | 705/7 |
| 5,806,078 A | 9/1998 | Hug et al. ................... | 715/511 |
| 6,185,591 B1 * | 2/2001 | Baker et al. ................. | 715/531 |
| 6,631,497 B1 * | 10/2003 | Jamshidi et al. ............. | 715/514 |

FOREIGN PATENT DOCUMENTS

WO    WO 99 52048 A1    10/1999

* cited by examiner

*Primary Examiner*—Cesar Paula
(74) *Attorney, Agent, or Firm*—Gunnison, McKay & Hodgson, L.L.P.; Forrest Gunnison

(57) ABSTRACT

A computer-implemented method of processing a document provides a user with a plurality of nested test modes for creating, reviewing and retrieving a plurality of different document configurations represented by different document data sets. The nested test modes are activated upon user request and a starting data set of the document is stored on a memory and restored after leaving the test mode. By nesting a plurality of test modes, the user can create a plurality of different configurations of a document and easily retrieve the data of every one of these configurations.

19 Claims, 7 Drawing Sheets

|   | A | B | C | D | E |
|---|---|---|---|---|---|
| 1 | 6 | 10 | C1=A1/2 | D1=C1/B1x100 | E1=C1+D1 |
| 2 |   |   |   |   |   |

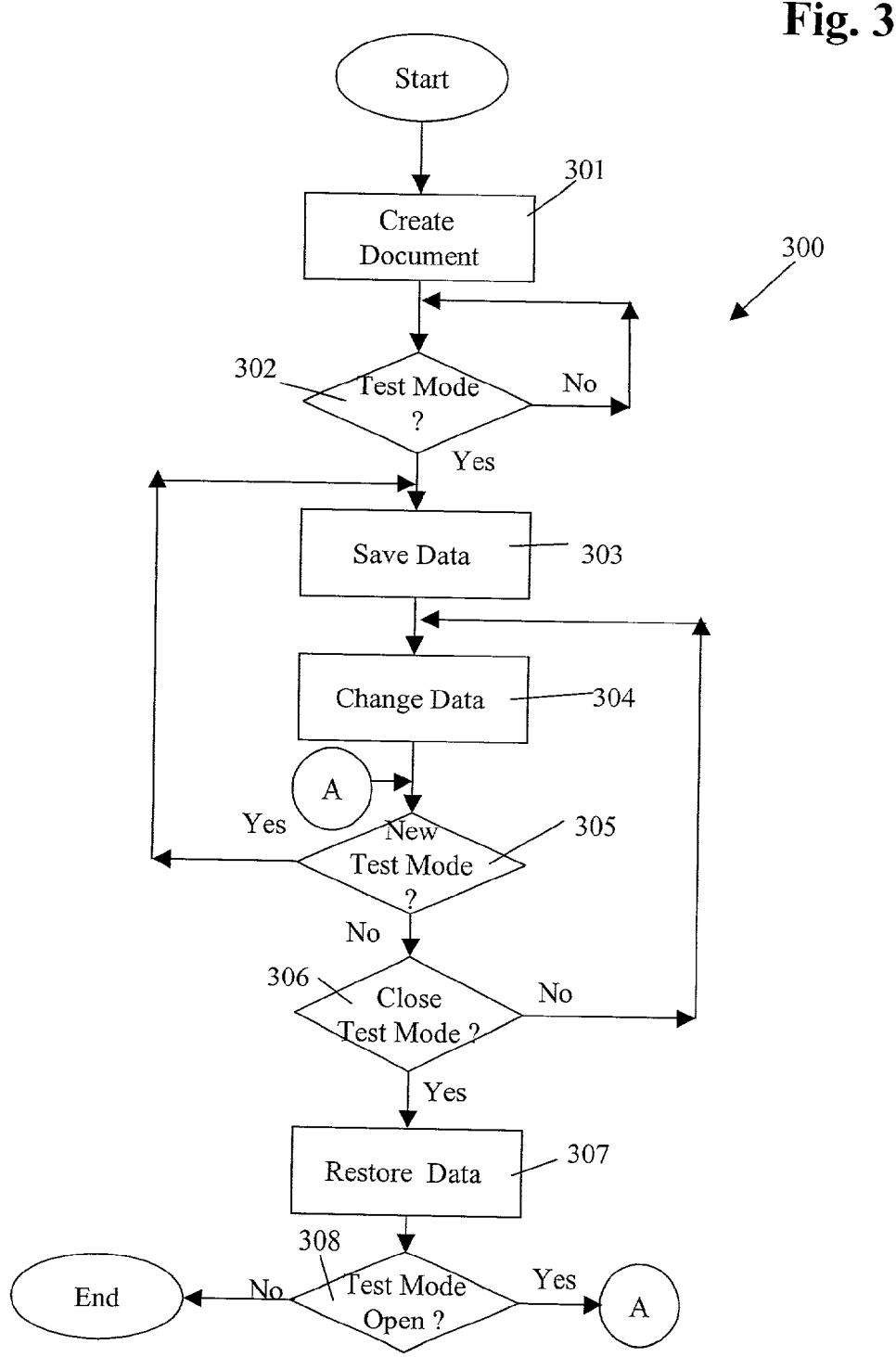

CREATING AND DISPLAYING DOCUMENT UNDO CONFIGURATION USING NESTED TEST MODES

BACKGROUND OF THE INVENTION

1. Field of the Invention

The present invention relates generally to computer-based methods for testing scenarios and in particular to handling a plurality of alternative test configurations for a computer readable document like a text document, a spreadsheet document or the like.

2. Description of Related Art

Many computer programs allow the creation of documents containing a plurality of depending numbers for different, related configurations of the document. Examples of such programs are tax calculation programs with a fixed set of input and output options or spreadsheet programs, which form the basis for implementation of any kind of calculation application.

FIG. 1 schematically illustrates as an example of a computer-based spreadsheet document 100 having a plurality of parameters including rows 1, 2, 3, . . . and columns A, B, C etc. In the example shown in FIG. 1, cells A1 and B1 are assigned parameter values 6 and 10, respectively. The contents of the cells C1, D1 and E1 are calculated based on the parameter values entered in cells A1 and B1. In the present example cell C1 has the value 3, cell D1 a value of 30, and cell E1 a value of 33.

If the user wishes to know the end result in cell E1 based on a different set of parameters values A, B, the user may, for example replace the value in cell A1 with 6, and replace the value in value in cell B1 with 7. If the user then wants to see the result for the combination of parameters 6 and 12, the values of both cells A1 and B1 have to be changed and the calculation carried out accordingly If such a program is used for carrying out complex calculations with a large number of related parameters, it is likely that a user, at some stage, wants to "test" what effect some parameter changes have on the whole calculation. Such programs like tax calculation programs offer a "test" or "what if" mode for this purpose. The user activates the "what if" mode, changes one or a plurality of input parameters, carries out the calculation based on these amended parameters and checks the result of the calculation.

If the user closes or exits the "what if" mode, the changed parameters are reset to their initial values. If the user has activated the "what if" mode, it could happen that the user wants to test some different parameter values but ultimately wishes to return to the current parameter configuration. The user then has only two options. Either the user can end the "what if" mode and start over from scratch, or the user can back up parameter by parameter until the user is back at the forking point. The larger the number of test paths, the more complicated the handling of different parameter sets becomes. It would therefore be desirable to provide a more user-friendly handling of different test configurations of documents having a large number of parameters dependent on other parameters.

Also, known in the prior art are version control systems. See for example, U.S. Pat. No. 5,806,078. However, such systems are not useful for testing the effects of various parameter sets in a computer-based method. In each case, the user would have to save a version at a point where a change in parameters was anticipated, complete the analysis, and then retrieve the saved version and start over with the different parameters. This avoids the backing-up parameter by parameter. However, in a short period, the number of revisions and tracking the various versions within the version control system becomes an unwieldy task that detracts from developing an understanding of the results from the testing. Also, if the user fails to save a version at the appropriate point, the user is simply back to the original task of backing up parameter by parameter. Moreover, such an approach works only when sufficient storage is available for all the various versions that must be saved. Finally, if a user saves a number of versions that are not wanted, the user must manually delete the unwanted versions.

SUMMARY OF THE INVENTION

According to one embodiment of the present invention, there is provided a computer-implemented method of processing a computer generated document providing a user a plurality of nested test modes for creating, reviewing and retrieving a plurality of different document configurations based on different document data sets. In one embodiment, the method includes:

activating, in response to a user request, a first test mode of a document having a document data set;

automatically storing a first test mode data set of the first test mode where the first test mode data set is the document data set at the time of the activating the first test mode;

changing data in the document data set in response to input of new data;

activating, in response to another user request, a second test mode;

automatically storing a second test mode data set of the second test mode wherein the second test mode data set is the document data set at the time of the activating the second test mode;

changing data in the document data set in response to input of other new data;

restoring the second test mode data set in the document upon leaving the second test mode; and restoring the first test mode data set in the document upon leaving the first test mode.

Herein, a plurality of nested test modes means that a new test mode can be opened while at the same time an earlier test mode is still open. A sequence of multiple derived test modes can therefore be created. The user, thus, can activate a new test mode at any time even if the user is already in a test mode. It is therefore possible to return to any desired document. configuration. It is not necessary to know in advance, where a test mode should be started. The handling of complex documents with many different properties depending on the value of some parameters is therefore greatly facilitated.

The document may be a spreadsheet document containing data arranged in a table, a text document, an Internet page, or any other type of document. The different configurations of the document may represent different formatting options of the document. It is then easily possible to test a plurality of different formatting options of e.g. a publishing document, to initiate a test mode at any time a promising formatting configuration has been reached and to test further variations based on this configuration.

According to a particular embodiment, all different data configurations of the document within a test mode are stored and can subsequently be accessed by the user. The user can then go along a path of variations that the user has created within the test mode, for example, by operating forward and backward keys.

According to a particular embodiment of the invention the different test modes may be represented as a tree structure and displayed on a display screen. The user can then select a desired one of the displayed test modes. A specific tool for navigating to the displayed test modes may be provided. Additionally, it is possible to further gain access to different configurations within one test mode through the displayed structure of test modes.

According to a further specific embodiment the test modes and the corresponding data configurations are stored together with the document on a memory like a hard disk or a CD- or DVD-Rom. The user can then access the starting configurations of all test modes also when he opens a document at a future working session.

A further implementation of the present invention provides a computer system for processing a document providing a user with a plurality of nested or derived test modes for creating, reviewing and retrieving a plurality of different configurations of the document represented by different data sets, the computer system comprising a memory for storing the document data and a processing unit for carrying out opening a document, activating a first test mode upon user request, automatically, storing the starting document data set of the first test mode, changing the document data upon user input of amended data, activating a second test mode upon user request, automatically storing the starting document data set of the second test mode, changing the document data upon user input of amended data, restoring the starting document data set of the second test mode upon leaving the second test mode, and restoring the first document starting data set upon leaving the first test mode.

A still further implementation of the present invention may be realized by a computer program for processing a computer-readable document providing a user with a plurality of nested test modes for creating, reviewing and retrieving a plurality of different configurations of the document represented by different document data sets, the computer program comprising program code for activating a first test mode upon user request, automatically storing the starting document data set of the first test mode, changing the document data upon user input of amended data, activating a second test mode upon user request, automatically storing the starting document data set of the second test mode, changing the document data Upon User input of amended data, restoring the starting document data set of the second test mode upon leaving the second test mode, and restoring the first document starting data set Upon leaving the first test mode.

A program code may be embodied in any form of computer program product. A computer program product comprises a medium which stores or transports computer-readable code, or in which computer-readable code can be embedded Some examples of computer program products are CD-ROM or DVD-ROM disks, ROM charts, floppy disks, magnetic tapes, computer hard drives, servers on a network and signals transmitted over the network representing a computer-readable program code.

BRIEF DESCRIPTION OF THE DRAWINGS

FIG. 1 is an illustrated of a prior art computer generated spreadsheet.

FIG. 3 is a process flow for one embodiment of the nested test mode module of FIGS. 2A and 2B.

DETAILED DESCRIPTION

Figure 2A:
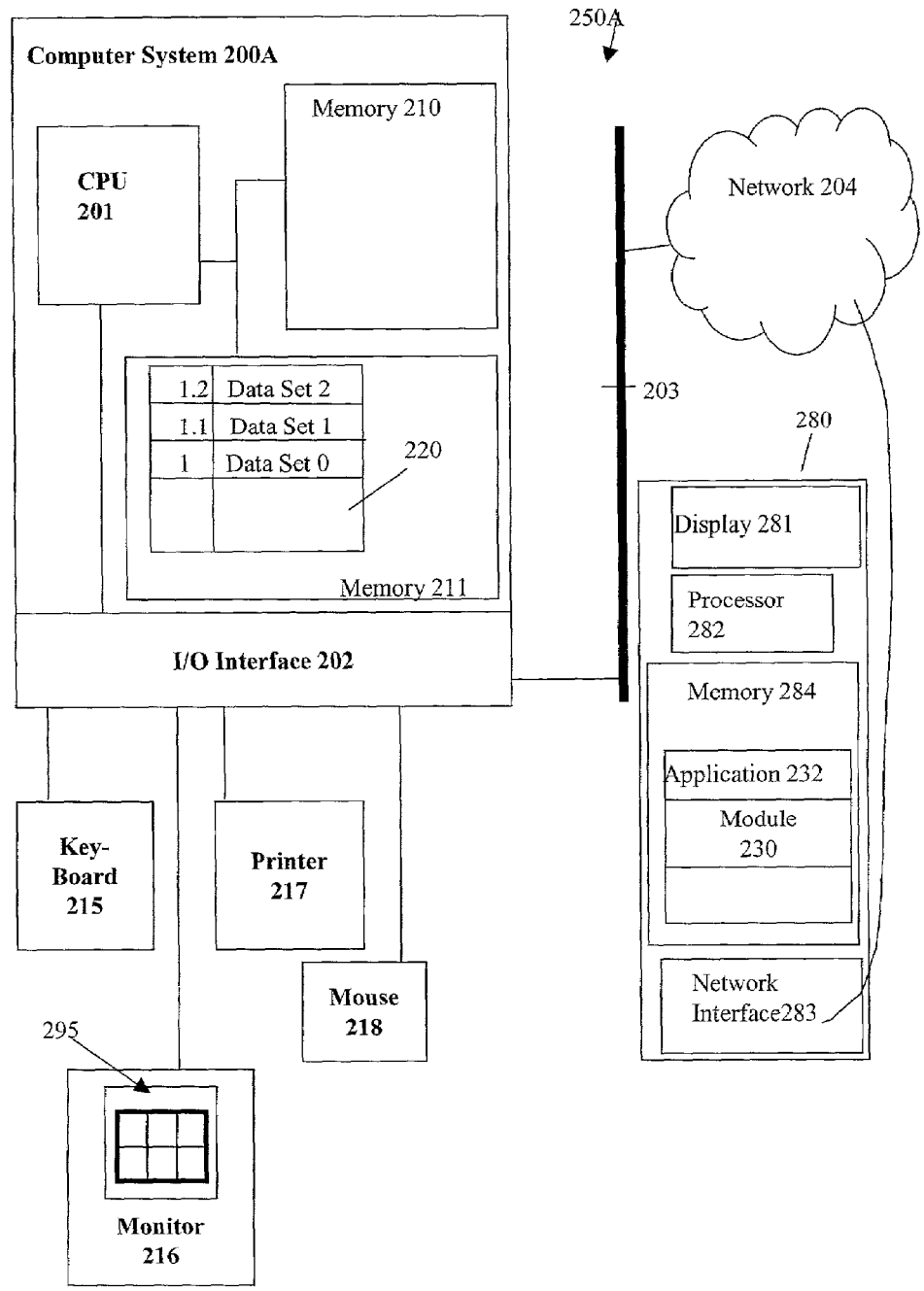
FIG. 2A is a block diagram of one computer system that includes an embodiment of the nested test mode module of this invention.

In one embodiment of the present invention, a computer-based application 232 (FIGS. 2A and 2B) includes a nested test mode module 230. Upon execution of application 232 including nested test mode module 230, a computer-generated document 295 is displayed on display unit 216. The user configures the computer generated document by entering a dataset, e.g., configures a spreadsheet as illustrated in FIG. 1, or perhaps provides display formatting directions. If the user desires to test a different data set that includes one or more members, the use activates a test mode.

Upon activation of the test mode, nested test module 230 is activated. In one embodiment, module 230 stores the current data set on structure 220 as data set 0. In one embodiment, memory structure 220 is a memory stack, and in another embodiment is an associative memory array structure. See processes 300 and 400 that are described more completely below.

For the example of FIG. 1, data set 0 includes cell A1 with a value of 6 and cell B1 with a value of 10. The user then tests alternative sets of data by amending the data in the computer-generated document. For example, the user tries different values in cell B1 of FIG. 1.

Figure 2B:
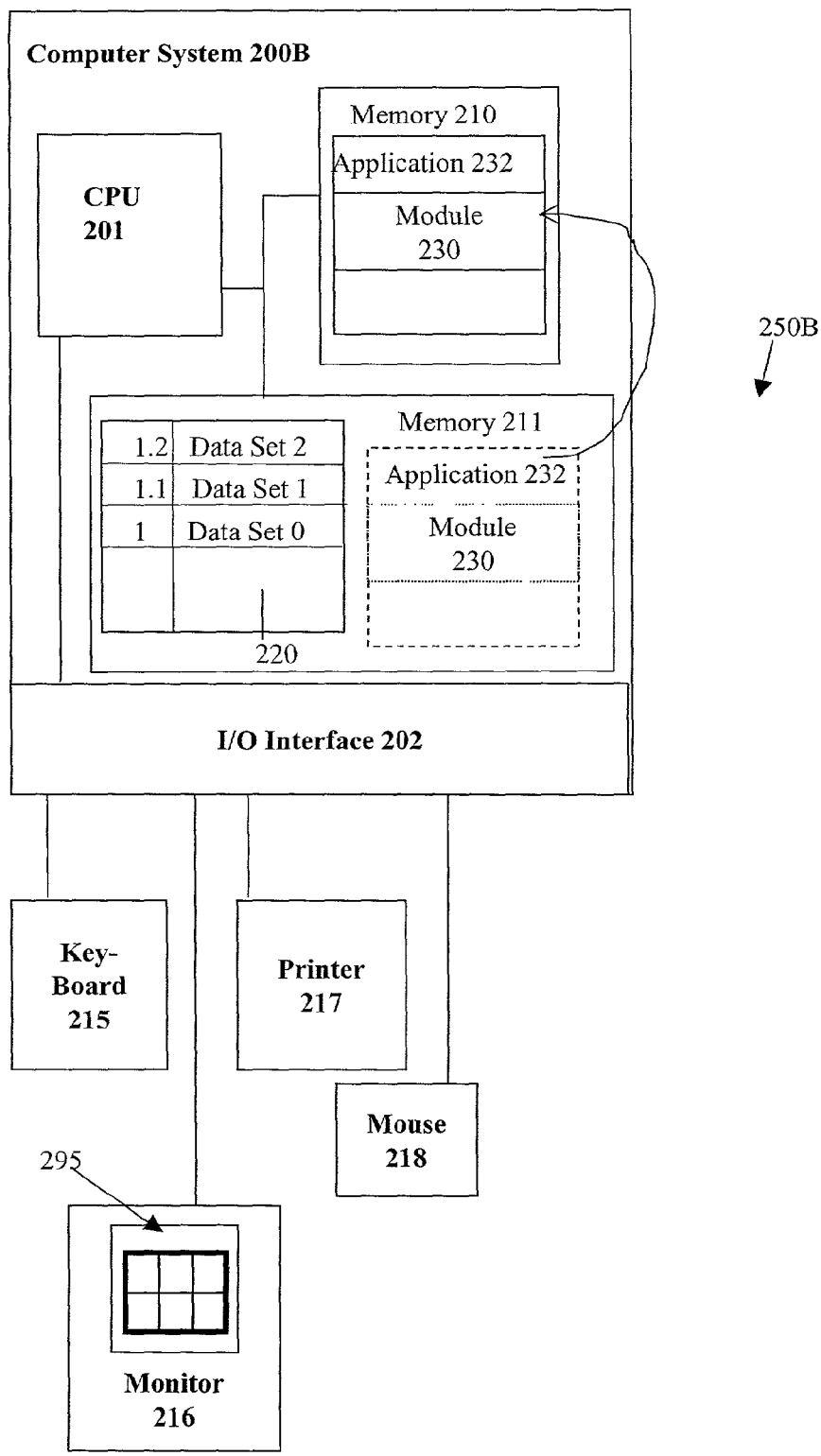
FIG. 2B is a block diagram of another computer system that includes an embodiment of the nested test mode module of this invention.

If the user reaches a point where the user wants to try perturbations on a different set of data, the user again activates nested test module 230 that, in one embodiment, stores the current data set, i.e., the data set in the computer-generated document when the nested test module was activated, on memory structure 220 as data set 1. In the example of FIGS. 2A and 2B, the user activates the nested test module 230 a third time and the current independent data at that time is saved as data set 2.

Hence, in this example, the user has nested three test modes. When the user closes the third test mode, data set 2 is removed from memory structure 220 and inserted in the document, and any dependent values are updated based on data set 2. The user can return to the original state by closing the second and first test modes, or alternatively, if the second test mode is the one the user wants to retain, the user simply saves the document after closing the third test mode, and then exits the document.

Here, use of a stack to store the data sets is illustrative only. In another embodiment, the data sets are stored in the associative array memory structure where a test mode identifier is used as a key to access and restore a selected data set in a plurality of test mode data sets in the associative array memory structure. If desired the keys and corresponding data sets in the associative array memory structure can be exploded into a hierarchical tree structure on a permanent storage device. One important aspect is to store the data sets so the correct original document configuration can be restored upon the closing of a particular test mode.

With nested test module 230, the user tests various scenarios without having to worry about whether the document has been saved as a particular version as required with a version control system. Also, the user can easily restore the original data if the testing does not prove fruitful. Therefore, testing using complex documents is now easily performed by any user that is familiar with application 232.

As described above, when the user inputs a command to leave a test mode by pressing a corresponding key(s) or by clicking on a corresponding area on the screen in a graphical user interface, the system (i) checks which test mode is closed, for example the third test mode that saved data set 2, (ii) retrieves the corresponding starting data configuration, and (iii) changes all independent and dependent parameters of the document to the values based on this starting data configuration. When leaving a particular test mode, the user therefore has the same document with the same parameter values as when entering this particular test mode. If new dependent values have been created during the test mode, however, these new dependent values are not removed upon closing the test mode but updated based on the original independent parameter values.

In FIG. 2A, application 232 and module 230 are stored in a memory 284 of a server 280 and executed on server 280 that is coupled to client computer system 200A by networks 203 and 204. The particular type of and configuration of client computer system 200A is not essential to this embodiment of the present invention. The only requirement is that the client device be able to display the information described herein, and to issue input commands, as described herein. Similarly, networks 203 and 204 can be any network or network system that is of interest to a user that couples client computer system 200A to server 280.

Similarly, the method used to store and retrieve the data and/or data sets for the various test modes is illustrative only and is not intended to limit the invention to the particular embodiments described herein. Finally, module 230 is illustrated as being a part of application 232 in FIGS. 2A and 2B. Again, this is illustrative only. Module 230 must only be capable of being called from application 230.

FIG. 2B is an example of when one embodiment of the present invention is implemented in a stand-alone computer system. The above comments with respect to FIG. 2A being illustrative only are directly applicable to FIG. 2B and are incorporated herein by reference.

FIG. 3 is a process flow diagram for one embodiment of a method 300 that results upon executing of nested test module 230. The sequence of operations in method 300 is illustrative only and is not intended to limit the invention to the specific sequence shown. As is know to those of skill in the art, events can be initiated at various points in time and when an event occurs, an event handler processes the event and branches to the appropriate location in method 300. For example, a new test mode can be created, or an existing test mode closed at any point.

After a user has created or opened a computer generated document in create document operation 301, method 300 waits in test mode check operation 302 for a test mode activation event indicating that the user wishes to carry out a modification to data in the document, like the spreadsheet shown in FIG. 1, with some alternative values.

Typically, an application stays in create document operation 301 until the user initiates an input action other than data entry. This input action is passed to an event handler that in turn performs a test mode check operation 302. Typically, as is known to those of skill in the art, an event handler is used with a graphic user interface. Consequently, the return from test mode check operation 302 back to check operation 302 should not be interpreted as requiring processing to idle in check operation 302 until the event happens. Instead, it is one way of indicating that operations 303 to 308 are not initiated until a test mode activation event is received by method 300. Upon receiving the test mode activation event, processing transfers from check operation 302 to save data operation 303.

In save data operation 303, the data configuration of the document in which the user is presently working is stored as the starting data configuration of the test mode. As explained more completely below, when the test mode is closed completely, the system, in this embodiment, automatically returns this starting data configuration. Therefore, the user can always be sure that the user can return to this data configuration irrespective of the amendments the user makes while in the test mode.

Upon saving the data, operation 303 transfers to change data operation 304. In change data operation 304, the user makes any desired changes to the data configuration and initiates corresponding test calculations.

The user may come to a point where the user wants to save a second data configuration, while at the same time going on with testing of further alternative data sets. This is represented by new test mode check operation 305. If the user initiates another test mode activation event, new test mode check operation 305 transfers processing to save data operation 303.

Hence, the user activates a further nested test mode working in the same way as the first test mode. Upon leaving the second test mode, the starting data configuration of the second test mode is restored. The user can, according to this embodiment, open as many nested test modes as the user wishes. For example, in the embodiments of FIGS. 2A and 2B, the user opened three nested test modes.

If the user does not initiate another test mode activation event, check operation 305 transfers processing to close test mode operation 306. If the user decides to leave the current test mode and initiates a close test mode event, check operation 306 transfers to restore data operation 307 and otherwise to change data operation 304. The return to change data operation 304 should not be interpreted as requiring the user to make further changes to the data. Rather, the current event is neither a new test mode event nor a close test mode event and so is not of interest for method 300. Upon completion of processing the current event, the user could issue immediately a close test mode event, or a new test mode event without any further data changes, and so processing would simply pass through operation 304 in this case.

In restore data operation 307, the starting data configuration of the most recent test mode is restored in the document that the user has been testing. Restore data operation 307 transfers processing to test mode open check operation 308. If the user has additional test modes open, check operation 308 returns processing to new test mode check operation 305. If the user neither initiates a new test mode, nor closes another open test mode, the user is returned to change data operation 304.

When the test mode which has been opened first is closed, the starting data configuration of this first test mode is restored in operation 307 and check operation 308 transfers to end that does any necessary clean-up and exits process 300.

While in FIG. 3, operations 303 to 308 are illustrated sequentially, this is for ease of understanding only and is not intended to limit this embodiment of the present invention to sequential execution of the operations. As is known to those of skill in the art, parallel operations may be implemented with some processors and operating systems to achieve the results described above.

Moreover, check operations 305 and 306 should not be interpreted as requiring continuing polling for the particular events described. Typically, an application stays in change data operation 304 until the user initiates an input action other than data entry. This input action is passed to an event handler that in turn performs check operation 305 and 306, as necessary. The events associated with check operations 305 and 306 can be invoked at anytime after initiation of the test mode of operation, and are processed appropriately by the event handler.

If computer program 232 for processing the document the user is presently working on has a so-called "undo" function, which allows the immediate correction of the latest user action, one embodiment of the present invention may be implemented using this "undo" function as follows. The "undo" function creates a stack of "old" versions of the document. Instead of storing the document data configuration upon initiating the test mode, the pointer to the corresponding data configuration of the document in the "undo", stack is saved in place of the data set. It is also possible to use versions of the document, which have already been saved in connection with the "undo" function, to save memory space.

In one embodiment of create document operation 301 and test mode check operation 302, when a test mode is activated in response to receipt of a user request, computer system 250A (FIG. 2A) and computer system 250B (FIG. 2B) first check in test mode check operation 302 which documents are presently opened and on which computer generated document (spreadsheet, text document, or others) the user is presently working. Check operation 302 next checks what parameters have been defined in this document, e.g. which cells of a spreadsheet table contain independent values. In the simple example of FIG. 1, only cells A1 and B1 contain independent parameter values and therefore have to be saved for the test mode. Note that when it is stated that a system takes some action, those of skill in the art understand that an instruction or instructions are executed that result in the stated action.

In this embodiment, save data operation 303 creates a data set containing all data necessary to completely define the starting data configuration of the document together with a test mode identifier, for example "test mode 1" or simple "1", as illustrated in FIGS. 2A and 2B, which allows assigning the stored data configuration to a particular test mode.

Figure 4:
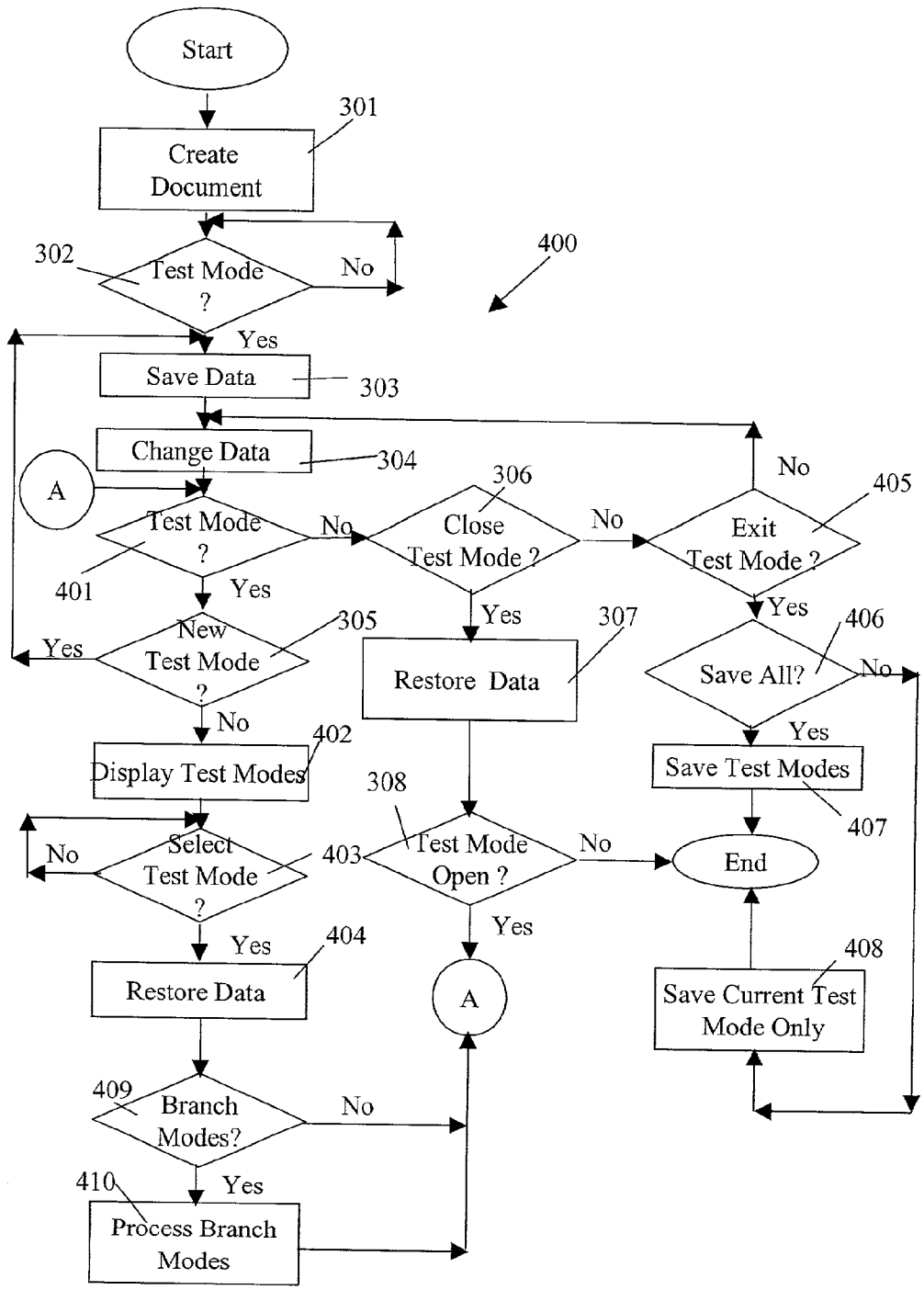
FIG. 4 is a process flow for another embodiment of the nested test mode module of FIGS. 2A and 2B.

FIG. 4 illustrates a further embodiment of the present invention, a process 400 that results from execution of another embodiment of nested test module 230. In process 400, operations with the same reference numeral as in FIG. 3 are equivalent to the operations described with respect to FIG. 3, and so the description associated with FIG. 3 is incorporated herein by reference.

The sequence of operations in method 400 is illustrative only and is not intended to limit the invention to the specific sequence shown. Again, as is know to those of skill in the art, events can be initiated at various points in time and when an event occurs, an event handler processes the event and branches to the appropriate location in method 400. For example, a new test mode can be created, an existing test mode closed, or the test mode can be exited at any point.

Briefly, after creating or opening a computer generated document in create document 301 (FIG. 4), when a first test mode is activated upon user command, test mode check operation 302 transfers processing to save data operation 303 (FIG. 4).

Figure 5:
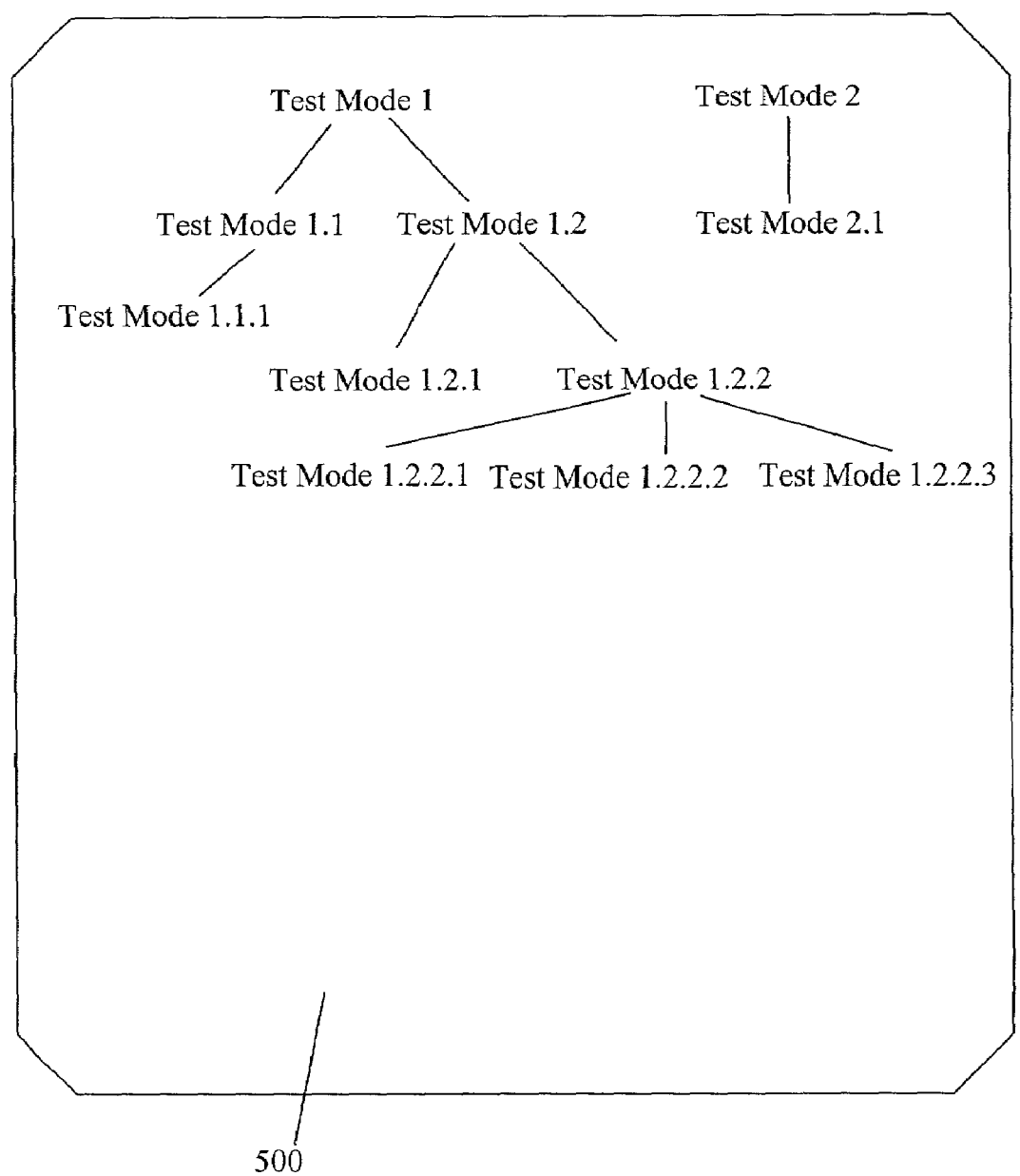
FIG. 5 schematically illustrates a tree representation of different test modes according to an embodiment of the present invention.

As in the first embodiment of FIG. 3, the starting data configuration is subsequently stored in save data operation 303. In this embodiment, a test mode identifier is also stored with the data configuration. The test mode identifier is selected for recognizing and storing an order of creation of each different document data set associated with a different test mode. The node labels in FIG. 5 are one example of test mode identifiers.

In change data operation 304, the user enters parameter changes and carries out corresponding calculations, or tests other desired operations such as formatting the computer-generated document.

If the user initiates an event other than data input while in change data operation 304, the event handler performs test mode check operation 401. If the event is a test mode initiation event, check operation transfers processing to new test mode check operation 305 and otherwise to close test mode check operation 306. If the event was a close test mode event, close test mode check operation 306 transfers to restore data operation 307, and otherwise to exit test mode check operation 405.

If the event was neither a test mode initiation event, a close test mode event, nor an exit test mode event, the event is not of interest to process 400 and so processing returns to change data operation 304. The return to change data operation 304 should not be interpreted as requiring the user to make further changes to the data. Rather, the current event is not of interest for method 400. Upon completion of processing the current event, the user could immediately issue one of the three events without any further data changes in operation 304.

If the event was a close test mode event, operations 307 to 308 are performed as described above. In one embodiment, the test mode event, the close test mode event and the exit test mode event are initiated upon selection of particular key combinations or alternatively selection of particular items in a graphic user interface.

In this embodiment, a test mode initiation event can be either for a new test mode, or for a return to a specific previous test mode. If the event is a new test mode initiation event, check operation 305 transfers to save data operation 303 and otherwise transfers to display test modes operation 402.

Display test modes operation 402 displays on a display screen 216 the test modes, which have already been created for the document on which the user currently works. FIG. 5 is an illustration of one embodiment of a display 500 in the form of a tree structure. Each branching point of the tree structure is assigned a test mode identifier that represents one of the test mode data sets. Notice that two nests of test modes are displayed.

For complex documents like tax calculations or the like it may be useful to use a large number of nested test modes to carry out tax calculations for a large number of different parameter variations. For these cases, the display of the different test modes in a tree structure, as illustrated in FIG. 5, allows a user to get an overview of the different test modes.

The tree structure represents the parameter variations of the different test modes. Test mode 1 and test mode 2 correspond to different values of the same parameter. Test modes 1.1 and test mode 1.2 implement variations of a second parameter and test modes 1.2.1 and 1.2.2 different values of a third parameter etc. Thus, the test mode identifiers provide recognition of the order of creation of each different test mode parameter set. The test mode identifiers also provide an order for storing each of the different test mode parameter sets.

Alternatively, test mode 1 corresponds to a first set of parameters and test mode 2 a second different set of parameters. In this case, test modes 1.1 and 1.2 represent variations of a sub-set of parameters within the first set of parameters and so forth.

According to a particular embodiment of the present invention, a navigation tool is provided for the user to navigate, for example by movement of a mouse device or the like, between the different test modes in display 500. The navigation tool includes a unit for detecting the current mouse position, a unit directing the cursor following the mouse position, a unit for detecting the cursor position on the displayed tree structure of test modes. If the cursor position is on one of the test mode identifiers, an additional table may be displayed showing the parameter values corresponding to this test mode. Similar navigation tools are used in many different types of computer programs.

Using this displayed tree structure and a corresponding navigation tool, when the user selects a particular one of the test modes of the document in display 500, select test mode check operation 403 transfers processing to restore data operation 404. Again, the user may not select a test mode for select test mode check operation 403 and instead issue a new test mode event, a close test mode event, or an exit test mode event. In each case, the event handler transfers processing to the appropriate check operation in method 400 and processing continues from that check operation.

When the user does select a test mode from the displayed test modes, restore data operation 404 restores the parameter set associated with the selected test mode identifier in the document and transfers to branch modes check operation 409. In contrast to the embodiment explained with reference to FIG. 3, it is therefore possible to change arbitrarily between all the test modes, which so far have been created.

Branch modes check operation 409 determines whether there are branch test modes from the test mode selected by the user. For example, if the user selects test mode 1.2, there are branch test modes 1.2.1, 1.2.2, and further branch modes 1.2.2.1 to 1.2.2.2 from test mode 1.2. In this case, check operation 409 transfers to process branch modes operation 410 and otherwise to test mode check operation 401, if there are no branch test modes for the user selected test mode.

In process branch modes operation 410, in one embodiment, each of the branch test modes from the user selected test mode are marked as invalid. This indicates that upon entry to the branch test mode, the test mode must be recalculated. In another embodiment of operation 410, each of the branch test modes is recalculated and saved. Operation 410 also transfers to test mode check operation 401.

In some cases, the user may decide that a particular set of test parameters is the only one of interest and all other test parameter sets may be discarded. In this case, the user wants to save the current test data as the valid data for the document and so the user issues an event to save only the current test mode.

In response to this event, exit test mode check operation 405 transfers to save all check operation 406 that in turn transfers to save current test mode only operation 408. Save current test mode only operation 408 saves the document with the current test parameters as the actual document. In this case, all other test parameter sets are simply deleted, and method 400 ends.

In another situation, the user may want not only to stop, but also to return for further testing at another time based upon the current test configuration. In this case, the user wants to save all test data and so the user issues an event to save all the test modes.

In response to this event, exit test mode check operation 405 transfers to save all check operation 406 that in turn transfers to save test modes operation 407. Save test modes operation 407 saves all the test modes with the document so that upon reopening the document, the test modes are available for further use. In this case, all test parameters sets are saved with the document, and method 400 ends. The embodiment of FIG. 4 is therefore particularly useful for complex documents where a large number of test modes involving many different parameters are created.

According to a further embodiment, it is possible to automatically store not only the starting data configuration but also every data configuration of the document the user creates within a test mode. The user can then track the test calculations the user has made in forward and in backward directions. According to a still further embodiment, it is possible to store the data configurations of the test modes together with the document in a permanent storage device.

The embodiments of the present invention are not only applicable to documents involving complex calculations like spreadsheet documents, but also the test modes, for example, may be applied also to different variations of a document. The user can try out different formatting options including character fonts, or perhaps various combinations of graphics, paragraphs etc., save promising versions as test modes or test documents and try out further improvements based on these test documents. Alternatively, the user can test graphic options such as borders, transparency, shadows, etc. For fonts, the user can test size, face, color etc. For paragraphs, the user can test borders, justification, line height etc.

Figure 6:
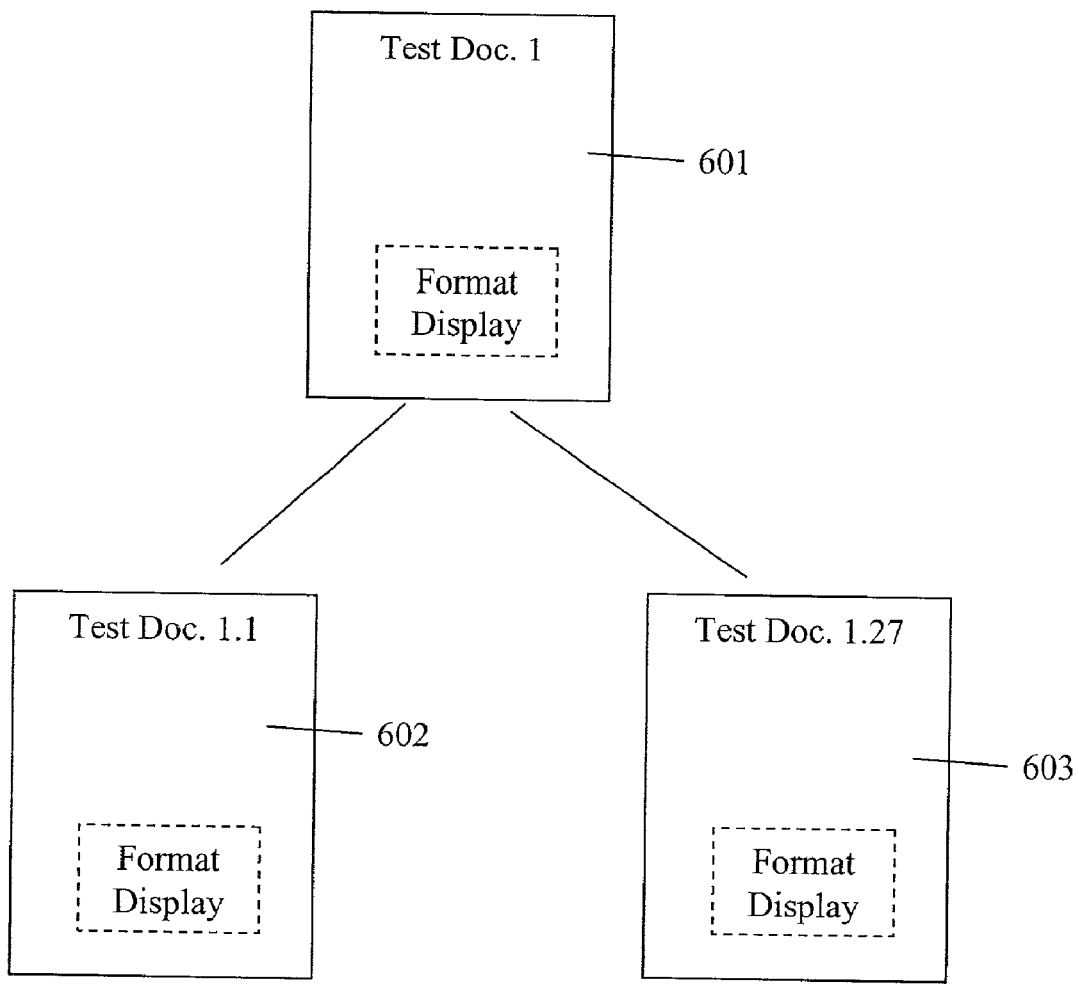
FIG. 6 schematically illustrates different formatting versions of a document representing different test modes according to an embodiment of the invention.

In each case, the different test documents may be displayed as shown in FIG. 6. Test documents 601 to 603 are represented as tree structure including an area in which indications of the selected format like character font or paragraph layout are displayed. Alternatively, it is also possible to display a test page of the document when the cursor touches a document area. It is so possible for the user to easily review the different formatting options of the document.

The present invention is applicable to a hardware configuration 250B like a personal computer or a workstation as illustrated schematically in FIG. 2B. The computer may comprise a central processing unit 201, an input output (I/O) unit 202, an internal memory 210 and an external memory 211. Hardware configuration 250B may further include standard input devices like a keyboard 215, a mouse 218 or a speech processing means (not illustrated).

Another embodiment of this invention, however, may also be applied to a client-server configuration 250A as illustrated in FIG. 2A. The computer generated document may be displayed on a display screen of client device 200A while some or all operations of method 300 or alternatively method 400 are carried out on a server computer 380 accessible by client device 300 over a data network 203 and 204 as the Internet using a browser application or the like.

Herein, a computer program product comprises a medium configured to store or transport computer readable code for method 300, method 400 or both or in which computer readable code for method 300, method 400, or both are stored. Some examples of computer program products are CD-ROM discs, ROM cards, floppy discs, magnetic tapes, computer hard drives, servers on a network and signals transmitted over a network representing computer readable program code.

As illustrated in FIGS. 2A and 2B, this storage medium may belong to the computer system itself. However, the storage medium also may be removed from the computer system. For example, method 300 may be stored in memory 284 that is physically located in a location different from processor 201. The only requirement is that processor 201 is coupled to the memory. This could be accomplished in a client-server system, or alternatively via a connection to another computer via modems and analog lines, or digital interfaces and a digital carrier line.

For example, memory 284 could be in a World Wide Web portal, while display unit 216 and processor 201 are in personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 200A, in one embodiment, can be a portable computer, a workstation, a two-way pager, a cellular telephone, a digital wireless telephone, a personal digital assistant, a server computer, an Internet appliance, or any other device that includes the components shown and that can execute method 300, method 400, or both, or that at least can provide the display capability and input responses described herein. Similarly, in another embodiment, computer system 200A can be comprised of multiple different computers, wireless devices, cellular telephones, digital telephones, two-way pagers, or personal digital assistants, server computers, or any desired combination of these devices that are interconnected to perform, the methods as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, methods 300 and 400 can be implemented in a wide variety of computer system configurations. In addition, methods 300 and 400 could be stored as different modules in memories of different devices. For example, method 300 could initially be stored in a server computer 280, and then as necessary, a module of method 300 could be transferred to a client device 200A and executed on client device 200A. Consequently, part of method 300 would be executed on the server processor 282, and another part of method 300 would be executed on processor 201 of client device 200A. In view of this disclosure, those of skill in the art can implement the invention of a wide-variety of physical hardware configurations using an operating system and computer programming language of interest to the user.

In yet another embodiment, method 300 and/or method is stored in memory 284 of system 280. Stored method 300 and/or method 400 is transferred, over network 203, 204 to memory 211 in system 200A. In this embodiment, network interface 283 and I/O interface 202 would include analog modems, digital modems, or a network interface card. If modems are used, network 204 includes a communications network, and method 300 is downloaded via the communications network.

Methods 300 and 400 may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, an embodiment of the present invention also relates to a data carrier for storing a computer program for carrying out the inventive method. Another embodiment of the present invention relates to a method for using a computer system for carrying out the presented inventive method. Yet another embodiment of the present invention relates to a computer system with a storage medium on which a computer program for carrying out the presented inventive method is stored.

While the invention has been shown with reference to particular embodiments thereof, it will be understood by those skilled in the art that various other changes in the form and details may be made therein without departing from the spirit and scope of the invention.

We claim:

1. A computer-implemented method comprising:

activating, in response to a user request, a first test mode of a document having a document data set;

automatically storing a first test mode data set of the first test mode upon entry of said first test mode wherein said first test mode data set is said document data set at the time of said activating said first test mode;

changing, in said first test mode, data in the document data set in response to input of new data to obtain a modified document data set;

determining, in said first test mode, upon user initiation of an event other than data input whether the event is a test mode initiation event;

determining, in response to said event being said test mode initiation, whether the test mode initiation event is a new test mode event;

activating, in response to said test mode initiation event being said new test mode event while in said first test mode, a second test mode wherein said second test mode is nested within said first test mode;

automatically storing a second test mode data set of the second test mode upon entry of said second test mode wherein said second test mode data set is said modified document data set at the the time of said activating said second test mode;

changing, in said second test mode, data in the modified document data set in response to input of other new data;

activating, in said first test mode and in response to said test mode initiation event not being said new test mode event, a display of tests modes saved for said document;

determining, in response to said event not being said test mode initiation event, whether said event is a close test mode event;

restoring the first test mode data set in said document, in response to said event being the close test mode event;

determining, in response to said event not being said test mode initiation event and not being the close test mode event, whether said event is a exit test mode event;

returning to said changing, in said first test mode, in response to said event not being any one of said test mode initiation event; the close test mode event; and said exit test mode event;

determining, in the second test mode, upon user initiation of another event other than data input whether the another event is said test mode initiation event;

determining, in the second test mode, in response to said another event not being said test mode initiation event, whether said event is said close test mode event;

restoring the second test mode data set in said document, in response to said another event being the close test mode event; and returning to said changing in said first test mode following said restoring the second test mode data set where said method provides a plurality of nested test modes for creating, reviewing and retrieving a plurality of different document configurations based on different document data sets.

2. The method of claim 1 wherein more than two nested test modes are available.

3. The method of claim 2 wherein said document is a spreadsheet document.

4. The method of claim 1 wherein said document is a spreadsheet document.

5. The method of claim 1 wherein the first and second test mode data sets correspond to different formatting options of a document.

6. The method of claim 1 wherein all test mode data sets are stored and accessible upon user request.

7. The method of claim 1, further comprising:
recognizing and storing an order of creation of each test mode data set.

8. The method of claim 7 further comprising:
enabling movement forward and backward between different stored test mode data sets.

9. The method of claim 8 comprising:
arranging said stored test mode data sets as a tree structure.

10. The method of claim 9 wherein said activating a display further comprises:
displaying the tree structure on a display medium; and
enabling the user to select a particular test mode data set represented in the tree structure using a graphical user interface.

11. The method of claim 8 comprising:
assigning an identification to each branching point of the tree structure, wherein said each branching point represents one of said test mode data sets.

12. A computer system comprising:
a memory having stored therein a nested test module;
a processor coupled to said memory wherein upon execution of said nested test module by said processor generates a method comprising:
activating, in response to a user request, a first test mode of a document having a document data set;
automatically storing a first test mode data set of the first test mode upon entry of said first test mode wherein said first test mode data set is said document data set at the time of said activating said first test mode;
changing, in said first test mode, data in the document data set in response to input of new data to obtain a modified document data set;
determining, in said first test mode, upon user initiation of an event other than data input whether the event is a test mode initiation event;
determining, in response to said event being said test mode initiation, whether the test mode initiation event is a new test mode event;
activating, in response to said test mode initiation event being said new test mode event while in said first test mode, a second test mode wherein said second test mode is nested within said first test mode;

automatically storing a second test mode data set of the second test mode upon entry of said second test mode wherein said second test mode data set is said modified document data set at the time of said activating said second test mode;

changing, in said second test mode, data in the modified document data set in response to input of other new data;

activating, in said first test mode and in response to said test mode initiation event not being said new test mode event, a display of tests modes saved for said document;

determining, in response to said event not being said test mode initiation event, whether said event is a close test mode event;

restoring the first test mode data set in said document, in response to said event being the close test mode event;

determining, in response to said event not being said test mode initiation event and not being the close test mode event, whether said event is a exit test mode event;

returning to said changing, in said first test mode, in response to said event not being any one of said test mode initiation event; the close test mode event; and said exit test mode event;

determining, in the second test mode, upon user initiation of another event other than data input whether the another event is said test mode initiation event;

determining, in the second test mode, in response to said another event not being said test mode initiation event, whether said event is said close test mode event;

restoring the second test mode data set in said document, in response to said another event being the close test mode event; and returning to said changing in said first test mode following said restoring the second test mode data set where said method provides a plurality of nested test modes for creating, reviewing and retrieving a plurality of different document configurations based on different document data sets.

13. The computer system of claim 12 wherein more than two nested test modes are available.

14. The computer system of claim 12 wherein said method further comprises:
recognizing and storing an order of creation of said test mode data sets.

15. The computer system of claim 14 wherein said method further comprising:
enabling movement forward and backward between said stored test mode data sets.

16. The computer system of claim 14 wherein said method further comprises:
arranging said stored test mode data sets as a tree structure.

17. The computer system of claim 16 wherein computer system further comprises a display medium and wherein said activating a display further comprises:
displaying the tree structure on said display medium; and
enabling the user to select a particular test mode data set represented in the tree structure using a graphical user interface.

18. A computer program product having stored thereon computer readable instructions for a method for nesting a plurality of test modes of a computer generated document, said method comprising:

activating, in response to a user request, a first test mode of a document having a document data set;

automatically storing a first test mode data set of the first test mode upon entry of said first test mode wherein said first test mode data set is said document data set at the time of said activating said first test mode;

changing, in said first test mode, data in the document data set in response to input of new data to obtain a modified document data set;

determining, in said first test mode, upon user initiation of an event other than data input whether the event is a test mode initiation event;

determining, in response to said event being said test mode initiation, whether the test mode initiation event is a new test mode event;

activating, in response to said test mode initiation event being said new test mode event while in said first test mode, a second test mode wherein said second test mode is nested within said first test mode;

automatically storing a second test mode data set of the second test mode upon entry of said second test mode wherein said second test mode data set is said modified document data set at the time of said activating said second test mode;

changing, in said second test mode, data in the modified document data set in response to input of other new data;

activating, in said first test mode and in response to said test mode initiation event not being said new test mode event, a display of tests modes saved for said document;

determining, in response to said event not being said test mode initiation event, whether said event is a close test mode event;

restoring the first test mode data set in said document, in response to said event being the close test mode event;

determining, in response to said event not being said test mode initiation event and not being the close test mode event, whether said event is a exit test mode event;

returning to said changing, in said first test mode, in response to said event not being any one of said test mode initiation event; the close test mode event; and said exit test mode event;

determining, in the second test mode, upon user initiation of another event other than data input whether the another event is said test mode initiation event;

determining, in the second test mode, in response to said another event not being said test mode initiation event, whether said event is said close test mode event;

restoring the second test mode data set in said document, in response to said another event being the close test mode event; and returning to said changing in said first test mode following said restoring the second test mode data set where said method provides a plurality of nested test modes for creating, reviewing and retrieving a plurality of different document configurations based on different document data sets.

19. A system comprising:

means for activating, in response to a user request, a first test mode of a document having a document data set;

means for automatically storing a first test mode data set of the first test mode upon entry of said first test mode wherein said first test mode data set is said document data set at the time of said activating said first test mode;

means for changing, in said first test mode, data in the document data set in response to input of new data to obtain a modified document data set;

means for determining, in said first test mode, upon user initiation of an event other than data input whether the event is a test mode initiation event;

means for determining, in response to said event being said test mode initiation, whether the test mode initiation event is a new test mode event;

means for activating, in response to said test mode initiation event being said new test mode event while in said first test mode, a second test mode wherein said second test mode is nested within said first test mode;

means for automatically storing a second test mode data set of the second test mode upon entry of said second test mode wherein said second test mode data set is said modified document data set at the time of said activating said second test mode;

means for changing, in said second test mode, data in the modified document data set in response to input of other new data;

means for activating, in said first test mode and in response to said test mode initiation event not being said new test mode event, a display of tests modes saved for said document;

means for determining, in response to said event not being said test mode initiation event, whether said event is a close test mode event;

means for restoring the first test mode data set in said document, in response to said event being the close test mode event;

means for determining, in response to said event not being said test mode initiation event and not being the close test mode event, whether said event is a exit test mode event;

means for returning to said changing, in said first test mode, in response to said event not being any one of said test mode initiation event; the close test mode event; and said exit test mode event;

means for determining, in the second test mode, upon user initiation of another event other than data input whether the another event is said test mode initiation event;

means for determining, in the second test mode, in response to said another event not being said test mode initiation event, whether said event is said close test mode event;

means for restoring the second test mode data set in said document, in response to said another event being the close test mode event; and means for returning to said changing in said first test mode following said restoring the second test mode data set where said method provides a plurality of nested test modes for creating, reviewing and retrieving a plurality of different document configurations based on different document data sets.

* * * * *